Dec. 4, 1962
O. JENSEN ETAL
3,067,361
HIGH SPEED INTERRUPTERS AND D.-C. CIRCUITS
Filed Aug. 27, 1958
2 Sheets-Sheet 1
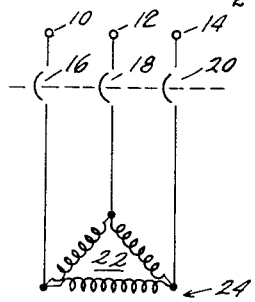
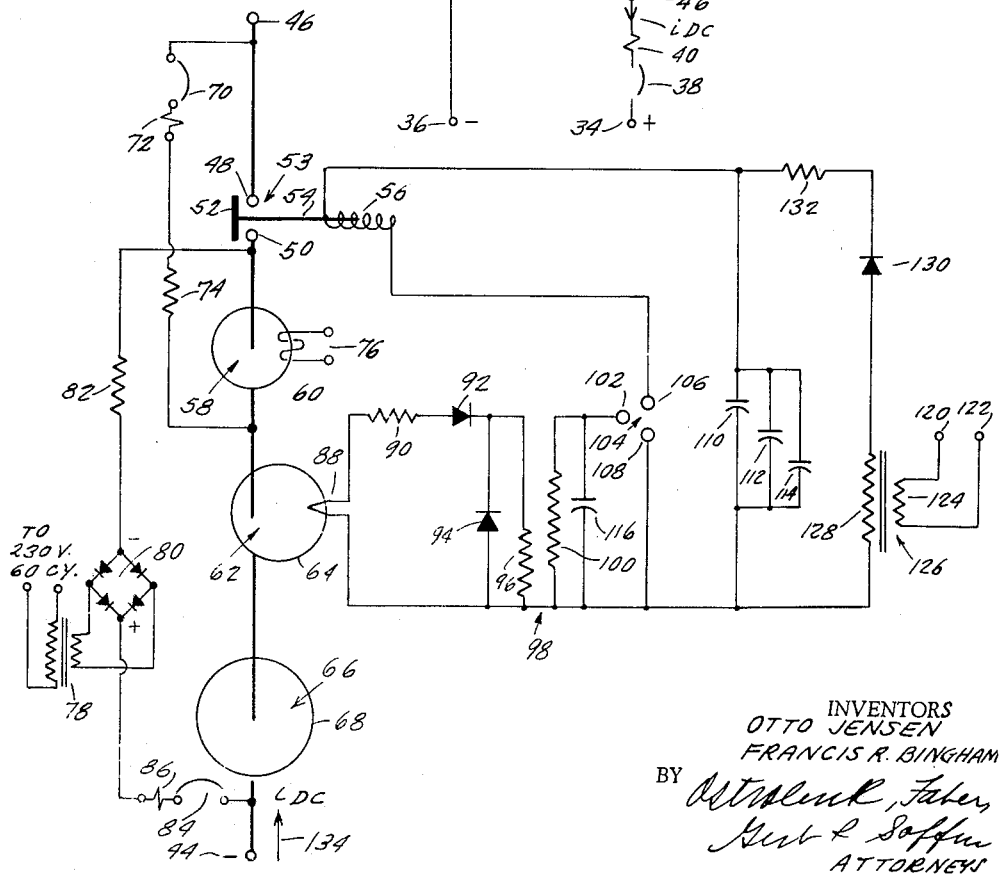
INVENTORS
OTTO JENSEN
FRANCIS R. BINGHAM
BY
ATTORNEYS

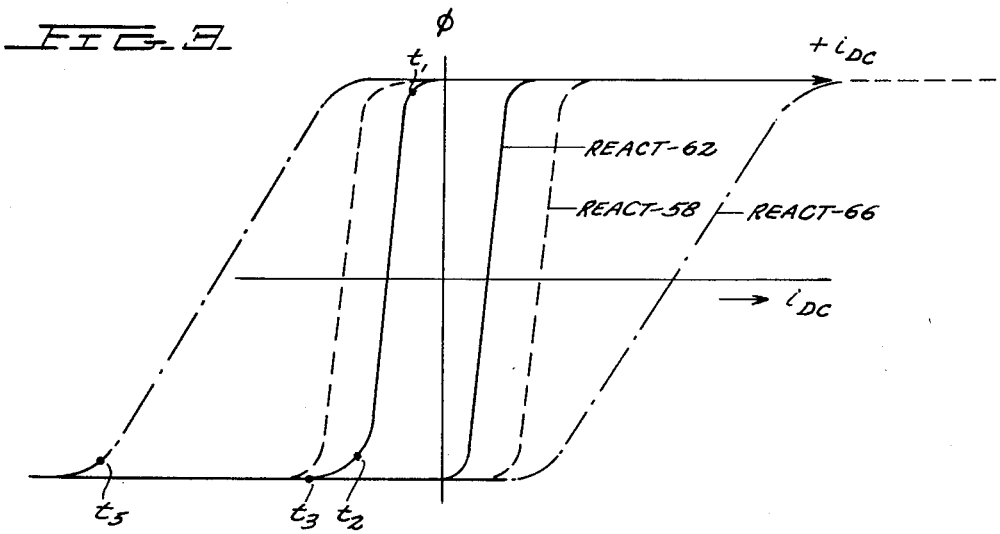
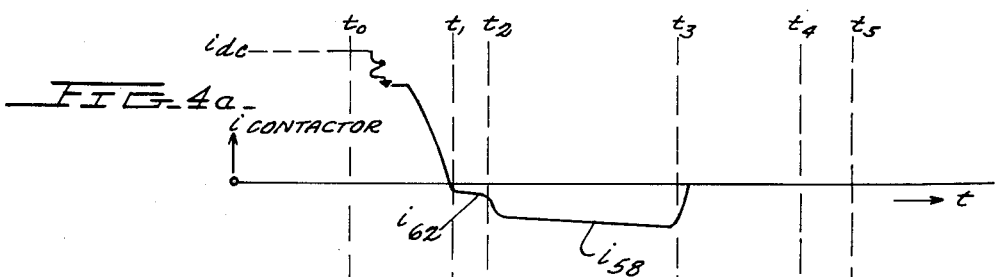
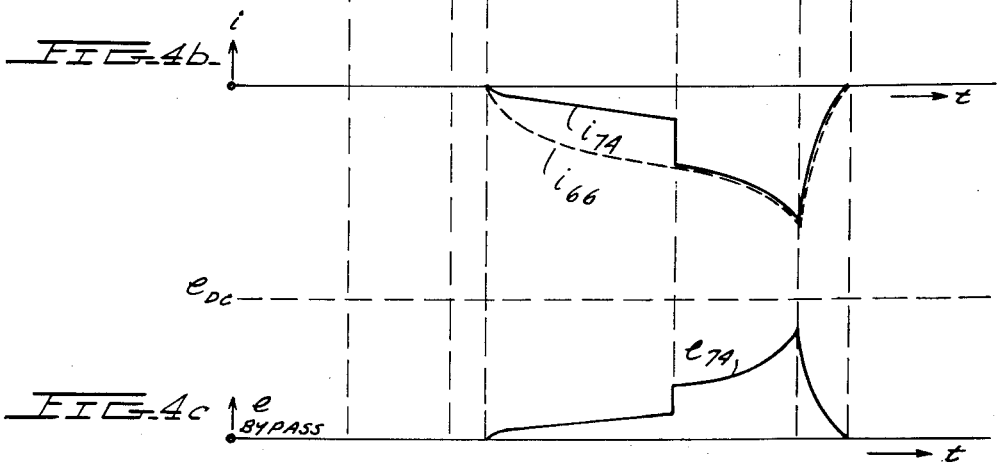
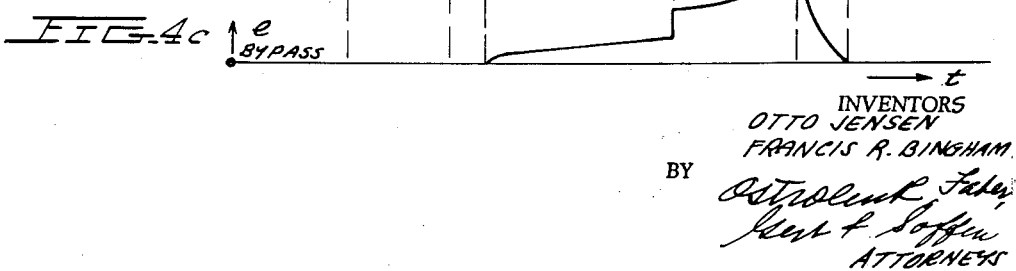

United States Patent Office 3,067,361
Patented Dec. 4, 1962

3,067,361
HIGH SPEED INTERRUPTERS AND D.-C. CIRCUITS
Otto Jensen, Malvern, and Francis R. Bingham, Norristown, Pa., assignors to I-T-E Circuit Breaker Company, Philadelphia, Pa., a corporation of Pennsylvania
Filed Aug. 27, 1958, Ser. No. 757,560
17 Claims. (Cl. 317—43)

Our invention relates to a high speed D.-C. interrupter device and more particularly relates to a high speed interrupter for D.-C. circuits which is operable responsible to a reversal of D.-C. current flow therethrough.

D.-C. circuits having high back E.M.F. elements therein are susceptible to a reversal of the D.-C. current when there is a fault within the system. Accordingly, circuit breakers for the D.-C. system are provided with reverse current trip units which operate to disconnect the load responsive to a reversal of current. It is essential in most applications to interrupt the circuit as fast as possible when this happens. Thus where a rectifier energizes a D.-C. load and there is a back-fire within the rectifier, the current will reverse through the faulted elements and will cause destruction of the remaining elements within a relatively few cycles of the A.-C. source. Further, this reverse current, which is limited only by an extremely small impedance, may rise to a sufficient value to substantially damage other equipment such as the bus network and auxiliary equipment.

A second reason for removing the faulted unit as soon as possible is that other parallel connected D.-C. sources will feed into the faulted unit so that they will carry an appreciable overload current which may be sufficient to remove them from the line and thus interrupt all of the power supplying the load.

For all of these reasons and many others which are well known to those skilled in the art, it is essential that a faulted D.-C. unit be disconnected from the load in as short a time as possible.

In the past, as been stated above, the main D.-C. breaker is equipped with reverse current trip means to cause the breaker to operate under reverse current conditions. It has been proposed, as set forth in copending application Serial No. 597,781, filed July 13, 1956, now Patent No. 2,949,568, issued August 16, 1960, entitled "Protection of Parallel Connected D.-C. Sources," in the name of Isadore K. Dortort and assigned to the assignee of the instant invention, to place a saturable type reactor or so called "step reactor" in series with the main D.-C. breaker. This reactor is normally saturated in its forward direction by the normal D.-C. current but is unsaturated when the D.-C. current reverses so as to hold the current to a very small value for a predetermined time when the D.-C. current passes the zero current value. If the reactor is made large enough, it is possible to have the breaker operate within this low current step. Since, however, the D.-C. breaker carries the full load current and must be able to interrupt any anticipated fault in the system, the breaker is a very large one and hence its operating time is relatively long.

Accordingly, the reactor must be a large one since it has to provide a relatively long step. Furthermore, if the step current is to be held to a relatively small value, it is necessary to use high quality (high permeabiliity) material for the reactor core and the reactor becomes an extremely expensive one.

The principle of our invention is to replace the normally used D.-C. breaker by an extremely high speed combination of a contactor which has very little interrupting capacity and which can carry the full load current of the system, and a circuit breaker having some interrupting capacity, but is rated to carry a very small load current. In this combination, the contactor will be seen to be capable of tremendously high speed operation since it requires no interrupting capacity. Furthermore, the circuit breaker, which will have some interrupted capacity but does not carry load current, will be an extremely small and inexpensive unit. The invention further allows the step reactor to have a core of relatively inexpensive material such as a silicon steel which is laminated in the usual manner since, as will be seen hereinafter, the step current of this component is not critical.

In a preferred embodiment of our invention, the contactor above described is connected in series with the step reactor and an additional compensation reactor which is very small in size and has a core of relatively high permeability material. The circuit interrupter, which has some interrupting capacity, is connected in parallel with the series combination of the contactor and the compensating reactor. Thus, during normal load conditions, the circuit breaker is short-circuited by the contactor and does not carry any appreciable current; hence it may be an extremely small unit. Under reverse current conditions, a signal taken from the circuit being protected initiates operation of the high speed contactor to a disengaged position. At this time, the compensating reactor will unsaturate so that the only current flowing through the series connected contactor and compensating reactor is the extremely small magnetizing current of the compensating reactor. The voltage drop across the contactor at this time equals the voltage drop across the parallel connected circuit which includes the small circuit breaker and some current limiting means. The current through the parallel circuit will be equal to the difference between the step current of the main step reactor and the very small magnetizing current of the compensating reactor. Even though the step reactor core is constructed of silicon steel, it will be understood that the current will be of relatively small value so that the product of this current and the relatively low impedance of the parallel circuit will yield a relatively low voltage. This voltage drop will be the voltage across the contactor when it operates. Therefore the contactor operates under low voltage as well as low current conditions and does not need any substantial interrupting capacity.

The circuit breaker in the parallel circuit has been closed during the operation described above and carries no substantial load current. Hence, this circuit breaker may be a small moulded case type of breaker and is adjusted to operate at some predetermined overload current. Therefore, after the contactor has operated and the current flow through the parallel circuit reaches a predetermined point, the circuit breaker will operate to completely disconnect the circuit. It is to be noted that the operating time of this circuit breaker will be extremely short since the breaker is small and the current at which it will operate is reached in an extremely short time.

It is now possible to understand why the compensating reactors may be of a relatively small size. The voltage drop across the reactor is substantially the small voltage across the current limiting means. It is this voltage drop which drives the compensating reactor through its step. Since the voltage is small, a relatively small reactor may provide a relatively long step.

In view of the foregoing, the primary object of our invention is to provide a novel high speed D.-C. interrupter.

Another object of our invention is to provide a high speed D.-C. interrupting system which is operable responsive to the reversal of D.-C. current.

A further object of our invention is to provide a reverse current interrupter means for a D.-C. system which operates within an extremely short time and is relatively inexpensive and small in size.

Still another object of our invention is to provide a reverse current trip means for D.-C. systems in which the normally used circuit breaker, which must carry the full load current of the system, is replaced by a high speed contactor having no substantial interrupting capacity and carries the full load current, and an auxiliary circuit breaker which has some interrupting capacity but normally does not carry load current.

A still further object of this invention is to replace the normally used step reactor of a D.-C. system by a main step reactor using inexpensive steel for its core having a relatively small high quality reactor.

These and other objects of our invention will become apparent from the following description taken in conjunction with the drawings in which:

FIGURE 1 shows a rectifier system which may utilize our novel invention.

FIGURE 2 is a circuit diagram of a preferred embodiment of our novel invention.

FIGURE 3 illustrates the hysteresis curve of the various reactors of FIGURE 2.

FIGURE 4a illustrates the current through the contactor of FIGURE 2 as a function of time.

FIGURE 4b illustrates the current of the by-pass circuit and step reactor of FIGURE 2 as plotted against the same time scale as that of FIGURE 4a.

FIGURE 4c illustrates the voltage across the by-pass circuit of FIGURE 2 as plotted against the same time scale as in FIGURES 4a and 4b.

Referring now to FIGURE 1, this figure shows a typical rectifier arrangement which could be utilized with our novel invention. However, it is to be noted that our novel invention is not limited to use in rectifier circuits but is universally applicable to any D.-C. system where it is desirable to operate an interrupting means responsive to a reverse of current in the system.

In the specific application of FIGURE 1, a three phase A.-C. source is connected to terminals 10, 12 and 14 and through the A.-C. breakers 16, 18 and 20 respectively to the delta connected primary winding 22 of the main rectifier transformer 24. Transformer 24 has a Y connected secondary winding 26 wherein each phase of secondary winding 26 is connected to a rectifier means 28, 30 and 32 respectively. Each of rectifier means 28, 30 and 32 is then connected together at their outputs and is then taken to a positive D.-C. output terminal 34. The negative terminal 36 of the rectifier is taken through a disconnect switch 37 and is connected to the center of Y connected secondary winding 26. The D.-C. breaker 38 is in series with terminal 34 and is of the normally constructed type and serves to connect and disconnect the D.-C. output of the rectifier to a load under normal conditions. Furthermore, the breaker 38 may have an overload trip element 40 associated therewith to operate breaker 38 responsive to overload currents. However, breaker 38 is not necessarily equipped with reverse current trip means.

In accordance with this invention, the reverse current trip means are provided within the schematically illustrated block 42 of FIGURE 1 which, as will be seen hereinafter, provides an extremely high speed disconnection of the rectifier unit and a load connected at terminals 34 and 36 responsive to a reversal of D.-C. current.

FIGURE 2 illustrates the circuit to be interposed between points 44 and 46 of FIGURE 1. The heavy line of FIGURE 2 represents the main bus bar. This bus bar includes a pair of relatively stationary contacts 48 and 50 which cooperate with a relatively movable contact 52. Contacts 48, 50 and 52 comprise the high speed contactor generally indicated as contactor 53, which is constructed to have very little interrupting capacity although it is designed to carry the full load current. This contactor may be of any desired high speed type such as the contactor set forth in copending application Serial No. 558,-348, filed January 10, 1956, entitled Electrodynamic Switching Device, in the name of Edward J. Diebold, now Patent No. 2,971,130.

For purposes of illustration, the contactor of FIGURE 2 is of the electromagnetic type wherein movable contact 52 is carried by a push rod means 54 which is operable responsive to the energization of operating coil 56. The energizing circuit of coil 56 which controls the movement of contact 52 from its normally engaged position to its disengaged position will be set forth more fully hereinafter.

The main current carrying circuit continues from stationary contact 50 and passes through compensating reactor 58 where the main bus contactor conductor forms a straight-through winding for the reactor core 60. Reactor core 60 is preferably constructed of a high quality high permeability wound tape which will give an extremely small magnetizing current. The main bus conductor then continues and forms the primary winding for a second reactor 62 which operates as a fault sensing element as will be more fully described hereinafter.

Reactor 62 is formed of a small high quality core 64 and preferably has a lower magnetizing current than does reactor 58. This is illustrated in FIGURE 3 wherein the magnetizing current of reactor 62 is shown in solid lines while the magnetizing current of reactor 58 is shown in the dotted lines. The main conductor then continues to form a winding for the main D.-C. step reactor 66 which has a core 68 which may be formed of relatively inexpensive transformer steel laminations. This is to be contrasted to the generally used step reactor in which great effort is made to provide a small magnetizing current. The magnetizing current of reactor 66 is seen in FIGURE 3 in the dot-dash lines and is seen to be typical of an inexpensive type of reactor.

The by-pass or parallel circuit for the series connected contactor 53 and compensating reactor 58 is comprised of circuit breaker 70 which has an overload trip means 72 associated therewith and a current limiting means such as resistor 74.

As has been previously noted, the current flow through compensating reactor 58 to the contactor is to be made as low as possible. The relatively low magnetizing current of reactor 58 therefore may be compensated by a D.-C. biasing means which supplies a substantial portion of the compensating reactor magnetizing current whereby even this small current will not flow through the contactor device. This D.-C. bias may be applied to auxiliary winding 76 of compensating reactor 58 in the well known manner. If desired, this bias may be such that a slightly positive current passes through the contactor 53 when reactor 62 is unsaturated.

After a circuit interruption operation, it will be seen hereinafter that each of cores 60, 64 and 68 will be driven through unsaturation and thus must be reset. This is accomplished by a D.-C. bias which is supplied from A.-C. source 78 which energizes the single phase bridge connected rectifier 80. The D.-C. output of rectifier 80 is then connected in series with resistor 82 and the D.-C. bus which acts as a primary winding and cores 60, 64 and 68. The circuit is then controlled by a circuit breaker 84 which is normally open, and closed when the flux of cores 60, 64 and 68 is to be reversed or reset. As soon as the flux reverses the current in the bias circuit rapidly increases and is limited only by the relatively small resistance of resistor 82. The circuit breaker 84 has an overload trip element 86 which is so adjusted that when the current rises after saturation of the cores it will automatically trip the circuit breaker 84 and the circuit is then ready for operation.

The signal generating circuit for operating contactor 53 is energized from a signal winding 88 on the trip impulse transformer 62. Winding 88 is then connected to a network including resistor 90 and diodes 92 and 94 to the primary winding 96 of high frequency transformer 98. The diodes 92 and 94 prevent the generation of a pulse which would, as seen hereinafter, automatically operate contactor 53 when the flux of reactor 62 is being reset by the D.-C. biasing circuit which includes rectifier 80. The secondary winding 100 of transformer 98 is then connected to the control electrode 102 of spark gap 104. Spark gap 104 includes the main electrodes 106 and 108 which are connected in series with the operating coil 56 of the contactor and a bank of capacitors including capacitors 110, 112, and 114. It is to be noted that the output of winding 100 is taken across capacitor 116 to absorb low level noise pulses.

The capacitor bank including capacitors 110, 112 and 114 is charged by a charging circuit which includes an A.-C. source connected to terminals 120 and 122 of primary winding 124 of transformer 126. The secondary winding 128 of transformer 126 is a high voltage winding and is connected in series with a diode 130, which could be a selenium rectifier, and a charging resistor 132.

The operation of our novel circuit may now be considered. It is assumed that a D.-C. current is established between the main source such as the rectifier in FIGURE 1 and a D.-C. load. Under these conditions, reactors 58, 62 and 66 will be saturated in their forward direction as indicated in FIGURE 3 where the positive D.-C. current $i_{DC}$ will be at some high saturating value. The direction of this D.-C. current is indicated at the bottom of FIGURE 2 by the arrow 134. The movable contact 52 of contactor 53 during this normal operation is closed, circuit breaker 70 is closed, circuit breaker 84 is open and the energy storage capacitor bank including capacitors 110, 112 and 114 is fully charged by the rectified voltage of secondary winding 128 of transformer 126.

Assume now that there is a fault within the system which causes a reversal in the current $i_{DC}$. This is shown in FIGURE 4a, where the current $i_{DC}$ begins to decrease at time $t_0$. The D.-C. current decreases until at time $t_1$ of FIGURES 3 and 4a it becomes negative and the value of the magnetizing current of the trip impulse transformer 62 is reached. Core 64 is then unsaturated and generates an extremely high voltage pulse to winding 88 for a relatively short time. By way of example, the core 64 is an extremely small one and the pulse may be of the order of 10 microseconds. This interval of unsaturation of core 64 is from the $t_1$ until time $t_2$ in FIGURE 4a, the magnetizing current of the core being indicated as $i_{62}$.

During this time interval, the current has not become negative enough to unsaturate either the step reactor 66 or the compensating reactor 58. Accordingly, during this time, there will be substantially no current flow in the parallel circuit including resistor 74 and circuit breaker 70 since it is shunted by the extremely low impedance of contactor 52 and the bust which serves as a primary winding for the compensating reactor 58.

The voltage pulse generated on winding 88 during the interval from $t_1$ to $t_2$ is in the forward conducting direction of diode 92 and is impressed across the reverse impedance of diode 94 and secondary winding 96. The pulse voltage is then stepped up by transformer 98 and an extremely high voltage appears across the secondary winding 100. This voltage is impressed across capacitor 116 and electrodes 102 and 108 of spark gap 104 and is designed to be sufficient to trigger the spark gap. Hence, the energy stored in capacitors 110, 112 and 114 is discharged through electrodes 106 and 108 and operating winding 56.

Winding 56 is then effective to drive push rod 54 of the contactor to move movable contact 52 of the contactor 53 to its disengaged position. A latching means of any desired type (not shown) is then operative to maintain contact 52 in its disengaged position until the system is reset.

Since contactor 52 is not provided with any interrupting capacity, it can operate in an extremely short time. Thus, the contactor is shown in FIGURES 4a and 4b to be moved to its disengaged position at time $t_3$ due to the signal pulse which occurs between times $t_1$ and $t_2$. During the time interval $t_2$ to $t_3$ when the movable contact 52 is being moved to its disengaged position, the core 64 has saturated (at time $t_2$) and the current is permitted to rise to a new level. In the circuit, including reactor 58 and contactor 52, the current designated as $i_{58}$ in FIGURE 4a will rise to a magnitude determined by the difference between the magnitude of the current and bias current of reactor 58.

It is to be noted that the current values during this interrupting sequence have been considerably exaggerated in 4a, 4b and 4c for purposes of illustration. Thus, the value of the current $i_{58}$ could possibly be $\frac{1}{10,000}$ of the value of the full load current $i_{DC}$.

As may be best seen in FIGURE 4b, at time $t_2$ the exciting current of core 68 of step reactor 66 is also permitted to rise to the relatively high magnetizing current of the step reactor as indicated by $i_{66}$ in the dotted line of FIGURE 4b. Since reactor 58 has a relatively low magnetizing current, a current flow is initiated in the by-pass circuit in resistor 74 and circuit breaker 70. This bypass current, indicated as $i_{74}$ in FIGURE 4b will be the difference between the magnetizing current $i_{66}$ of the step reactor 66 and $i_{58}$ of the compensating reactor. The voltage which drives compensating reactor 58 through its step will be the voltage drop which appears across the by-pass circuit. That is to say, the instantaneous voltage across the reactor 58 with contact 52 in its engaged position will be the current $i_{74}$ times the value of resistor 74. Since this current is substantially limited to the step current of reactor 66, and since the impedance of the by-pass circuit may be extremely small, it will be apparent that this voltage will be a relatively low value and is shown in an exaggerated manner as $e_{74}$ in FIGURE 4c.

Accordingly, the compensating reactor 58 is driven by a relatively small voltage so that it may be of a relatively small size in order to give an interval of unsaturation which is equivalent to the interval given by step reactor 66 which absorbs the bulk of the voltage of the circuit.

From the foregoing, it will be seen that at time $t_3$ when movable contact 52 of the contactor 53 disengages its cooperating contacts 48 and 50, the current flowing through the contactor is the relatively small current $i_{58}$ while the instantaneous voltage which is to be interrupted is the relatively small voltage $e_{74}$ which is the voltage drop on resistor 74. Accordingly, the interrupting duty on the contactor is extremely small so that it need not have any interrupting capacity.

Once the contactor 53 has opened, the current $i_{74}$ will be identical to the magnetizing current of step reactor 66 and will increase at a relatively rapid rate after reactor 66 saturates. Because of this increase, the overload trip member 72 of circuit breaker 70 will be energized at time $t_4$ so that it will automatically interrupt the circuit at time $t_5$. Since the circuit breaker 70 need not carry any current during normal operating conditions (it is normally short circuited by contactor 53), it may be an extremely small and inexpensive breaker with some interrupting capacity whereby it can interrupt the relatively low step current of step reactor 66 and the voltage of the circuit.

In summary, our novel invention permits the use of a high speed contactor having no interrupting capacity but capable of carrying the full load current of the circuit and circuit breaker having some interrupting capacity but carrying no current during normal operating conditions which operate to disconnect the circuit responsive to a reversal of current in the circuit. The invention further permits the use of relatively cheap iron for the core of the main step reactor of the circuit.

Once the circuit has operated as described above, it will be understood that all of the cores 60, 64 and 68 are saturated in the opposite direction to that in which they are normally to be saturated. When the system is to be reconnected, the movable contact 52 is moved to its engaged position with respect to contacts 48 and 50. Note that the main circuit breaker is still open (circuit breaker 38 of FIGURE 1) so the contactor 53 does not close an energized circuit. After this, circuit breaker 84 is then closed to connect the D.-C. voltage of rectifier 80 to the primary windings of cores 60, 64 and 68 so that these cores will be driven through their step to be saturated in an opposite direction. While the cores are unsaturated, it is clear that the current in this biasing circuit will be limited to their magnetizing current and thus the overload trip means 86 will not be activated. However, when the cores are saturated in the proper direction, the current through this circuit will rapidly increase so as to automatically operate circuit breaker 84 through its trip means 86 and thus disconnect the biasing circuit. The circuit is then ready for a new protective operation when the main D.-C. circuit is closed.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. A high speed circuit interrupter for D.-C. circuits; said high speed circuit interrupter being operable responsive to reversal of current in the circuit being protected and comprising a high speed contactor having substantially no interrupting capacity and a current rating at least equal to the rated current of the circuit being protected, a step reactor, a circuit breaker having a relatively small interrupting capacity and a small rated current and overload trip means and, a reverse current sensing means; said step reactor and said high speed contactor being connected in series; said circuit breaker being connected in parallel with said contactor and normally being short circuited by said contactor; said reverse current sensing means being inductively coupled to the circuit being protected and said contactor to open said contactor responsive to a reversal of current in said circuit being protected; said contactor being shunted by said circuit breaker during said opening operation; said reverse current thereafter rising through said step reactor and circuit breaker to unsaturate said step reactor and being held to the value of the magnetizing current of said step reactor for a predetermined time; said rise of current through said step reactor and circuit breaker being effective to operate said overload trip means of said circuit breaker.

2. A high speed circuit interrupter for D.-C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to siad circuit being protected and said high speed contactor to open said high speed contactor responsive to reversal of current in the circuit being protected.

3. A high speed circuit interrupter for D.C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means for operating said circuit breaker, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; said compensating reactor and said step reactor being normally saturated by normal forward current in the circuit being protected and unsaturating responsive to reversal of current in the circuit being protected.

4. A high speed circuit interrupter for D.-C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means for operating said circuit breaker, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; said compensating reactor and said step reactor being normally saturated by normal forward current in the circuit being protected and unsaturating responsive to reversal of current in the circuit being protected; said step reactor having a core of relatively inexpensive material, said compensating reactor having a core of relatively high permeability material.

5. A high speed circuit interrupter for D.-C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means for operating said circuit breaker, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; said compensating reactor and said step reactor being normally saturated by normal forward current in the circuit being protected and unsaturating responsive to reversal of current in the circuit being protected; said compensating reactor having D.-C. biasing means connected thereto for decreasing the magnetizing current of said compensating reactor when said reactor is unsaturated.

6. A high speed circuit interrupter for D.-C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; said compensating reactor and said step reactor being normally saturated for current flow in a first direction; said step reactor and said compensating reactor unsaturating when said current reverses to maintain the current through said contactor at the magnetizing current of said compensating reactor and the current through said circuit breaker at the difference between the magnetizing current of said step reactor and the magnetizing current of said compensating reactor.

7. A high speed circuit interrupter for D.-C. circuits; said high speed circuit interrupter being operable responsive to reversal of current in the circuit being protected and comprising a high speed contactor having substantially no interrupting capacity and a current rating at sponsive to reversal of current in the circuit being protected, a step reactor, a compensating reactor, a circuit breaker having a relatively small interrupting capacity and small rated current and overload trip means, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; said compensating reactor and said step reactor being normally saturated for current flow in a first direction; said step reactor and said compensating reactor unsaturating when said current reverses to maintain the current through said contactor at the magnetizing current of said compensating reactor and the current through said circuit breaker at the difference between the magnetizing current of said step reactor and the magnetizing current of said compensating reactor; the voltage driving said compensating reactor being the voltage drop across said parallel path including said current limiting means; said compensating reactor having a volt-second rating substantially smaller than the volt-second rating of said step reactor.

8. A high speed circuit interrupter for D.-C. circuits; said high speed circuit interrupter being operable responsive to reversal of current in the circuit being protected and comprising a high speed contactor having substantially no interrupting capacity and a current rating at least equal to the current rating of the circuit being protected, a step reactor, a compensating reactor, a circuit breaker having a relatively small interrupting capacity and small rated current and overload trip means, a reverse current sensing means, and a current limiting means; said step reactor, compensating reactor, and high speed contactor being connected in series; said circuit breaker and current limiting means being connected in series and forming a parallel connected path with respect to said series connected contactor and compensating reactor; said reverse current sensing means being inductively coupled to said circuit being protected and said high speed contactor to open said high speed contactor responsive to reversal of current in the circuit being protected; and reset means for said compensating reactor and said step reactor; said reset means including a D.-C. biasing means and automatically operable switching means in series with a winding on said compensating reactor and said step reactor; said reset means generating ampere turns in a direction to reverse the flux of said compensating reactor and said biasing reactor after said reversal of current from said first direction, said automatically operable switching means disconnecting said reset circuit after reversal flux in said compensating reactor and step reactor and responsive to a rapid rise of current in said reset circuit.

9. A high speed interrupter comprising in combination a contactor, a step reactor, a compensating reactor and a circuit breaker; said contactor comprising a pair of contacts movable between an engaged and disengaged position; trip means for operating said contactor, said step reactor comprising a step reactor winding wound on a magnetic core; said compensating reactor comprising a compensating reactor winding wound on a magnetic core; said circuit breaker comprising a pair of movable contacts movable between an engaged and disengaged position; current responsive means connected in series with the contacts of said circuit breaker for operating said circuit breaker; said cooperating contacts of said contactor, said compensating reactor winding, and said step reactor winding being connected in series; said circuit breaker cooperating contacts being connected in parallel with said series connected contactor cooperating contacts and compensating reactor winding.

10. A high speed interrupter comprising in combination a contactor, a step reactor, a compensating reactor and a circuit breaker; said contactor comprising a pair of contacts movable between an engaged and disengaged position; trip means for operating said contactor, said step reactor comprising a step reactor winding wound on a magnetic core; said compensating reactor comprising a compensating reactor winding wound on a magnetic core; said circuit breaker comprising a pair of movable contacts movable between an engaged and disengaged position; current responsive means connected in series with the contacts of said circuit breaker for operating said circuit breaker; said cooperating contacts of said contactor, said compensating reactor winding, and said step reactor winding being connected in series; said circuit breaker cooperating contacts being connected in parallel with said series connected contactor cooperating contacts and compensating reactor winding; said contactor having substantially no interrupting capacity and being rated to carry the full current of said interrupter; said circuit breaker having a relatively low interrupting capacity and normally having substantially no current flow therethrough.

11. A high speed interrupter comprising in combination a contactor, a step reactor, a compensating reactor and a circuit breaker; said contactor comprising a pair of contacts movable between an engaged and disengaged position; trip means for operating said contactor, said step reactor comprising a step reactor winding wound on a magnetic core; said compensating reactor comprising a compensating reactor winding wound on a magnetic core; said circuit breaker comprising a pair of movable contacts movable between an engaged and disengaged position; current responsive means connected in series with the contacts of said circuit breaker for operating said circuit breaker; said cooperating contacts of said contactor, said compensating reactor winding, and said step reactor winding being connected in series; said circuit breaker cooperating contacts being connected in parallel with said series connected contactor cooperating contacts and compensating reactor winding; said magnetic core of said step reactor being of relatively low permeability material; said core of said compensating reactor being of relatively high permeability material.

12. A high speed interrupter comprising in combination a contactor, a step reactor, a compensating reactor and a circuit breaker; said contactor comprising a pair of contacts movable between an engaged and disengaged position; trip means for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; current responsive means connected in series with the contacts of said circuit breaker for operating said circuit breaker; said cooperating contacts of said contactor, said compensating reactor winding, and said step reactor winding being connected in series; said circuit breaker cooperating contacts being connected in parallel with said series connected contactor cooperating contacts and compensating reactor winding; said contactor having substantially no interrupting capacity and being rated to carry the full current of said interrupter; said circuit breaker having a relatively low interrupting capacity and normally having substantially no current flow therethrough; said magnetic core of said step reactor being of relatively low permeability; said cores of said compensating reactor being of relatively high permeability material.

13. A high speed interrupter comprising in combination a contactor, a step reactor, a compensating reactor and a circuit breaker; said contactor comprising a pair of contacts movable between an engaged and disengaged position; means for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; said cooperating contacts of said contactor, said compensating reactor winding, and said step reactor winding being connected in series; said circuit breaker cooperating contacts being connected in parallel with said series connected contactor cooperating contacts and compensating reactor winding; said contactor having substantially no interrupting capacity and being rated to carry the full current of said interrupter; said circuit breaker having a relatively low interrupting capacity and normally having substantially no current flow therethrough; said magnetic core of said step reactor being of relatively low permeability; said core of said compensating reactor being of relatively high permeability material; said circuit breaker further including an overload trip element; said overload trip element being operatively connected to said circuit breaker cooperating contacts to operate said cooperating contacts from their said engaged position to their said disengaged position responsive to relatively low current flow through said overload trip element; said overload trip element being electrically connected in series with said circuit breaker cooperating contacts.

14. A high speed interrupter comprising in combination a contactor, a step reactor, a compensating reactor and a circuit breaker; said contactor comprising a pair of contacts movable between an engaged and disengaged position; means for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; said cooperating contacts of said contactor, said compensating reactor winding, and said step reactor winding being connected in series; said circuit breaker cooperating contacts being connected in parallel with said series connected contactor cooperating contacts and compensating reactor winding; said magnetic core of said step reactor being of relatively low permeability material; said core of said compensating reactor being of relatively high permeability material; and a D.-C. biasing means for said magnetic core of said compensating reactor; said D.-C. biasing means being connected to decrease the magnetizing current of said compensating reactor winding when said compensating reactor core is unsaturated.

15. A high speed interrupter comprising in combination a contactor, a step reactor, a compensating reactor and a circuit breaker; said contactor comprising a pair of contacts movable between an engaged and disengaged position; means for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; said cooperating contacts of said contactor, said compensating reactor winding, and said step reactor winding being connected in series; said circuit breaker cooperating contacts being connected in parallel with said series connected contactor cooperating contacts and compensating reactor winding; said contactor having substantially no interrupting capacity and being rated to carry the full current of said interrupter; said circuit breaker having a relatively low interrupting capacity and normally having substantially no current flow therethrough; said compensating reactor core and said step reactor core being normally saturated for current flow in a first direction; said step reactor core and said compensating reactor core unsaturating when said current reverses to thereby maintain the current through said cooperating contacts of said contactor at the magnetizing current of said compensating reactor core and to further maintain the current through said circuit breaker cooperating contacts at the difference between the magnetizing current of said step reactor winding and the magnetizing current of said compensating reactor winding.

16. A high speed interrupter comprising in combination a contactor, a step reactor, a compensating reactor and a circuit breaker; said contactor comprising a pair of contacts movable between an engaged and disengaged position; trip means connected to said contactor for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; said cooperating contacts of said contactor, said compensating reactor winding, and said step reactor winding being connected in series; said circuit breaker cooperating contacts being connected in parallel with said series connected contactor cooperating contacts and compensating reactor winding; current responsive means connected in series with the contacts of said circuit breaker for operating said circuit breaker; said contactor having substantially no interrupting capacity and being rated to carry the full current of said interrupter; said circuit breaker having a relatively low interrupting capacity and normally having substantially no current flow therethrough; current responsive means connected in series with the contacts of said circuit breaker for operating said circuit breaker; said compensating reactor core and said step reactor core being normally saturated for current flow in a first direction; said step reactor core and said compensating reactor core unsaturating when said current reverses to thereby maintain the current through said cooperating contacts of said contactor at the magnetizing current of said compensating reactor core and to further maintain the current through said circuit breaker cooperating contacts at the difference between the magnetizing current of said step reactor winding and the magnetizing current of said compensating reactor winding; said step reactor core being of a relatively low permeability material, said compensating reactor core being of a relatively high permeability material.

17. A high speed interrupter comprising in combination a contactor, a step reactor, a compensating reactor and a circuit breaker; said contactor comprising a pair of contacts movable between an engaged and disengaged position; trip means connected to said contactor for operating said contactor; said step reactor comprising a step reactor winding wound on a magnetic core; said compensating reactor comprising a compensating reactor winding wound on a magnetic core; said circuit breaker comprising a pair of movable contacts movable between an engaged and disengaged position; said cooperating contacts of said contactor, said compensating reactor winding, and said step reactor winding being connected in series; said circuit breaker cooperating contacts being connected in parallel with said series connected contactor cooperating contacts and compensating reactor winding; current responsive means connected in series with the contacts of said circuit breaker for operating said circuit breaker; said contactor having substantially no interrupting capacity and being rated to carry the full current of said interrupter; said circuit breaker having a relatively low interrupting capacity and normally having substantially no current flow therethrough; said compensating reactor core and said step reactor core being normally saturated for current flow in a first direction; said step reactor core and said compensating reactor core unsaturating when said current reverses to thereby maintain the current through said cooperating contacts of said contactor at the magnetizing current of said compensating reactor core and to further maintain the current through said circuit breaker cooperating contacts at the difference between the magnetizing current of said step reactor winding and the magnetizing current of said compensating reactor winding; said step reactor core being of a relatively low permeability material, said compensating reactor core being of a relatively high permeability material; and reset means for said compensating reactor core and said step reactor core; said reset means including means for applying D.-C. ampere turns to said step reactor core and said compensating reactor core; said means for applying said D.C. ampere turns including automatically operable switching means connected in circuit controlling relation with respect to said means for applying said D.-C. ampere turns; said reset means generating ampere turns in a direction to reverse the flux of said compensating reactor core and said biasing reactor core after said reversal of current from said first direction; said automatically operable switching means disconnecting said reset means after reversal of flux in said compensating reactor core and said step reactor core and responsive to a rapid rise in said ampere turns generated by said means for applying D.-C. ampere turns.

References Cited in the file of this patent

UNITED STATES PATENTS

| | | |
|---|---|---|
| 2,672,584 | Rolf | Mar. 16, 1954 |
| 2,677,092 | Schmidt | Apr. 27, 1954 |
| 2,693,566 | Hooper | Nov. 2, 1954 |
| 2,969,495 | Mosch | Jan. 24, 1961 |

FOREIGN PATENTS

| | | |
|---|---|---|
| 1,009,273 | Germany | May 29, 1957 |